United States Patent
Myoga et al.

(10) Patent No.: US 10,722,742 B2
(45) Date of Patent: *Jul. 28, 2020

(54) METHOD FOR DETOXIFYING ASBESTOS (71) Applicants: KOKIGUMI CO., LTD, Nagoya-shi, Aichi (JP); NATIONAL UNIVERSITY CORPORATION TOTTORI UNIVERSITY, Tottori-shi, Tottori (JP)

(72) Inventors: Toshimitsu Myoga, Nagoya (JP); Koichi Takahashi, Nagoya (JP); Kazuhiro Iizuka, Nagoya (JP); Yuhei Matsubara, Tottori (JP); Toshiyuki Tanaka, Yonago (JP); Hisaki Okamoto, Tohaku-gun (JP)

(73) Assignees: KOKIGUMI CO., LTD, Aichi (JP); NATIONAL UNIVERSITY CORPORATION TOTTORI UNIVERSITY, Tottori (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/098,418

(22) PCT Filed: Jul. 6, 2018

(86) PCT No.: PCT/JP2018/025764
§ 371 (c)(1),
(2) Date: Nov. 1, 2018

(87) PCT Pub. No.: WO2019/187180
PCT Pub. Date: Oct. 3, 2019

(65) Prior Publication Data
US 2019/0374805 A1 Dec. 12, 2019

(30) Foreign Application Priority Data

Mar. 28, 2018 (JP) ................... 2018-063057

(51) Int. Cl.
*A62D 3/36* (2007.01)
*A62D 101/41* (2007.01)

(52) U.S. Cl.
CPC ............ *A62D 3/36* (2013.01); *A62D 2101/41* (2013.01)

(58) Field of Classification Search
CPC ......... A62D 3/36; A62D 2101/41; A62D 3/30
USPC .......................................... 588/411
See application file for complete search history.

(56) References Cited

U.S. PATENT DOCUMENTS

| 2010/0048976 A1* | 2/2010 | Sakamoto ................. A62D 3/33 588/321 |
| 2014/0081067 A1* | 3/2014 | Tour ...................... B01J 20/3204 588/13 |
| 2019/0358480 A1* | 11/2019 | Myoga ..................... A62D 3/33 |

FOREIGN PATENT DOCUMENTS

| JP | 2011-072915 A | 4/2011 |
| JP | 2011-078931 A | 4/2011 |
| WO | 2010/055830 A1 | 5/2010 |

OTHER PUBLICATIONS

Matsushima et al., "Practical Model Experiment of Asbestos Waste Chemical Decomposition using Acid," Journal of the Japan Society of Material Cycles and Waste Management, 2017, vol. 28, pp. 101-113.

* cited by examiner

*Primary Examiner* — Edward M Johnson
(74) *Attorney, Agent, or Firm* — Oliff PLC (57) ABSTRACT

The method for detoxifying asbestos disclosed here includes: preparing an asbestos-containing substance that contains at least one type of asbestos; preparing an asbestos treatment agent that contains a mineral acid and N-methyl-2-pyrrolidone; and bringing the asbestos-containing substance into contact with the asbestos treatment agent so as to detoxify asbestos in the asbestos-containing substance. Due to this configuration, asbestos in the asbestos-containing substance can be favorably detoxified.

7 Claims, 10 Drawing Sheets

METHOD FOR DETOXIFYING ASBESTOS

TECHNICAL FIELD

The present invention relates to a method for detoxifying asbestos. More specifically, the present invention relates to a method for detoxifying asbestos and a treatment agent used in the method.

The present application claims the benefit of priority based on Japanese Patent Application No. 2018-063057, filed on Mar. 28, 2018, the contents whereof are incorporated in the present description by reference.

BACKGROUND ART

Asbestos has a needle-like crystal structure obtained by serpentine or hornblende transforming into a fibrous form. Examples of such types of asbestos include chrysotile, amosite, crocidolite, anthophyllite, tremolite and actinolite. These types of asbestos exhibit excellent heat resistance and durability and are inexpensive, and were therefore widely used in a variety of technical fields in the past. Specifically, asbestos-containing substances that contain such types of asbestos were used in fillers for slate sheets, water pipes, fireproof covering materials, brake pads, gaskets, heat insulating boards, ropes, packings, acetylene cylinders, and the like.

However, because it has been established that these types of asbestos can be a primary cause of health problems such as pulmonary asbestosis, lung cancer and malignant mesothelioma, new uses have been banned in recent years. In addition, because continued use of asbestos-containing members used in the past involves risks, there is a need to rapidly detoxify asbestos using methods that do not have an adverse effect on humans and the environment.

Methods for treating such types of asbestos include melting by heating to 1500° C. or higher, chemical decomposition by reacting with prescribed asbestos treatment agents, and burial in landfill sites.

One example of such a detoxification method involving chemical decomposition is the method disclosed in Patent Document 1. In the method disclosed in this document, an asbestos-containing waste material is brought into contact with an aqueous solution of a detoxification (an asbestos treatment agent) to which is added a fluoride (a fluoride salt or hydrofluoric acid of an alkali metal, alkaline earth metal or ammonia) and a mineral acid (hydrochloric acid, sulfuric acid, nitric acid, or the like), and applying ultrasonic vibrations while allowing the solution to stand (or while stirring the solution).

In addition, Non-Patent Document 1 discloses another example of a method for detoxifying asbestos using an asbestos treatment agent that contains a mineral acid and a fluoride.

CITATION LIST

Patent Literature

[Patent Document 1] Japanese Patent Application Publication No. 2011-72915

Non-Patent Literature

[Non-Patent Document 1] Journal of the Japan Society of Material Cycles and Waste Management, Vol. 28, pages 101 to 113, 2017

SUMMARY OF INVENTION

Technical Problem

In recent years, there has been a further increase in the amount of asbestos-containing waste materials requiring detoxification and disposal, and the number of requests to rapidly and reliably detoxify asbestos in such asbestos-containing substances has increased.

The present invention was created in response to these requests, and the purpose of the present invention is to provide a method for detoxifying asbestos in order to more favorably detoxify asbestos in asbestos-containing substances.

Solution to Problem

In order to achieve the objective mentioned above, the present invention provides a method for detoxifying asbestos, which has the following configuration. Moreover, "detoxifying asbestos" in the present invention means breaking down the needle-like crystal structure of at least a part of the asbestos contained in an asbestos-containing substance and altering other structures, in other words, altering the structure so as to cause substantially no health problems to humans.

Moreover, according to the first article of the 99th Ministry of the Environment of Japan public notice of 2006, the property that there is no risk harm to human health or the environment means that asbestos is not detected. Here, "asbestos is not detected" means that asbestos is substantially not detected in cases where a sample is analyzed using an analysis method involving a dispersion dyeing method using a phase contrast microscope and an X-Ray diffraction analysis method using an X-Ray diffraction apparatus, or that asbestos is substantially not detected when using an analysis method involving the use of a transmission electron microscope (TEM).

Therefore, according to the method for detoxifying asbestos disclosed here, it is possible to easily achieve a state in which asbestos is substantially not detected.

The method for detoxifying asbestos disclosed here includes: preparing an asbestos-containing substance that contains at least one type of asbestos; preparing an asbestos treatment agent that contains a mineral acid and N-methyl-2-pyrrolidone; and bringing the asbestos-containing substance into contact with the asbestos treatment agent so as to detoxify asbestos in the asbestos-containing substance.

As a result of a variety of experiments and investigations into achieving the objectives mentioned above, the inventors of the present invention surprisingly found that by using a mixed liquid containing a mineral acid and N-methyl-2-pyrrolidone (NMP) as an asbestos treatment agent, asbestos could be detoxified more favorably than with conventional asbestos treatment agents. At present, the detailed action mechanism of such an asbestos treatment agent containing a mineral acid and NMP is unclear, but it is surmised that when asbestos and the mineral acid react in the presence of the NMP, an asbestos detoxification reaction progresses further.

The method for detoxifying asbestos disclosed here has been developed on the basis of such findings, and by using an asbestos treatment agent containing a mineral acid and NMP, it is possible to detoxify asbestos in asbestos-containing substances more favorably than in the past.

In addition, in another preferred aspect of the method for detoxifying asbestos disclosed here, the asbestos-containing substance contains at least chrysotile.

Chrysotile is a serpentine form of asbestos and is represented by the formula $Mg_3Si_2O_5(OH)_4$. As a result of experiments by the inventors of the present invention, it was confirmed that among a variety of types of asbestos, chrysotile could be detoxified particularly favorably by using the detoxification method disclosed here.

In another preferred aspect of the method for detoxifying asbestos disclosed here, the mineral acid is sulfuric acid.

Examples of the mineral acid contained in the asbestos treatment agent include sulfuric acid, hydrochloric acid, nitric acid, phosphoric acid, boric acid and hydrofluoric acid. Of these, sulfuric acid can be used particularly favorably due to being inexpensive and exhibiting high reactivity with asbestos.

In another preferred aspect of the method for detoxifying asbestos disclosed here, the asbestos-containing substance is brought into contact with the asbestos treatment agent for a period of at least 1 hour, for example 1 to 2 hours.

By making the period of contact between the asbestos-containing substance and the asbestos treatment agent 1 hour or longer, as in the present aspect, the asbestos-containing substance and the asbestos treatment agent react with each other well and asbestos in the asbestos-containing substance can be more favorably detoxified. In addition, by setting the period of contact to be 2 hours or less, asbestos can be detoxified with good efficiency.

In another preferred aspect of the method for detoxifying asbestos disclosed here, the asbestos treatment agent is heated to a temperature range that is higher than 50° C. and lower than the boiling point of the treatment agent before the asbestos-containing substance is brought into contact with the asbestos treatment agent.

By heating the asbestos treatment agent before carrying out detoxification, as in the present aspect, reactivity between the mineral acid and the asbestos can be improved and the time required for detoxification can be shortened.

In another preferred aspect of the method for detoxifying asbestos disclosed here, the asbestos-containing substance that is brought into contact with the asbestos treatment agent is in the form of a powder.

By forming the asbestos-containing substance into a powder in advance, as in the present aspect, the area of contact between the asbestos-containing substance and the asbestos treatment agent increases, and hence the asbestos-containing substance and the asbestos treatment agent react with each other well, meaning that the asbestos can be more favorably detoxified.

In addition, another aspect of the present invention provides an asbestos treatment agent.

This asbestos treatment agent is used to detoxify asbestos in an asbestos-containing substance that contains at least one type of asbestos. And the asbestos treatment agent contains a mineral acid, and N-methyl-2-pyrrolidone.

By using an asbestos treatment agent containing a mineral acid and NMP, as mentioned above, it is possible to detoxify asbestos in asbestos-containing substances more favorably than with a conventional asbestos treatment agent.

In another preferred aspect of the asbestos treatment agent disclosed here, the mineral acid is sulfuric acid.

Because sulfuric acid is inexpensive and exhibits high reactivity with asbestos, as mentioned above, sulfuric acid can be used particularly favorably as the mineral acid in the asbestos treatment agent disclosed here.

In another preferred aspect of the asbestos treatment agent disclosed here, the concentration of the N-methyl-2-pyrrolidone is 0.1 to 10 wt % when the treatment agent as a whole is taken to be 100 wt %.

Because the asbestos treatment agent disclosed here contains NMP, as mentioned above, it is possible to detoxify asbestos more favorably than with a conventional asbestos treatment agent. Here, the concentration of NMP in the asbestos treatment agent is preferably 0.1 to 10 wt %, and more preferably 1 to 10 wt %, for example 2.5 wt %.

DESCRIPTION OF EMBODIMENTS

Preferred embodiments of the present invention will now be explained. Moreover, matters which are essential for carrying out the invention and which are matters other than those explicitly mentioned in the present specification are matters that a person skilled in the art could understand to be matters of design on the basis of the prior art in this technical field. The present invention can be carried out on the basis of the matters disclosed in the present specification and technical knowledge in this technical field. Moreover, in cases where a numerical range is denoted by "A to B" in the present application, this means "not less than A and not more than B".

1. Asbestos Treatment Agent

First, an explanation will be given of the asbestos treatment agent used in the method for detoxifying asbestos according to the present embodiment.

The asbestos treatment agent according to the present embodiment contains a mineral acid and N-methyl-2-pyrrolidone. Specific details are given below, but by detoxifying asbestos using this type of asbestos treatment agent, asbestos in an asbestos-containing substance can be favorably detoxified. Explanations will now be given of materials contained in the asbestos treatment agent.

(1) Mineral Acid

As mentioned above, the asbestos treatment agent according to the present embodiment contains a mineral acid. Mineral acids able to be used in the past to detoxify asbestos can be used without limitation as this mineral acid. Examples of the mineral acid include sulfuric acid, hydrochloric acid, nitric acid, phosphoric acid, boric acid and hydrofluoric acid. In addition, the asbestos treatment agent according to the present embodiment may contain two or more of the mineral acids mentioned above. Moreover, among the mineral acids mentioned above, sulfuric acid can be used particularly favorably from the perspectives of being inexpensive and exhibiting high reactivity with asbestos.

Moreover, if the overall mass of the asbestos treatment agent is taken to be 100 wt %, the concentration of mineral acid is preferably 1 to 50 wt %, and more preferably 10 to 30 wt %, for example approximately 25 wt % (±1 wt %). Due to this configuration, asbestos in the asbestos-containing substance reacts favorably with the mineral acid and can be detoxified. In addition, the pH of the mineral acid-containing asbestos treatment agent is 4 or less, preferably 2 or less, and more preferably 1 or less, for example.

(2) N-methyl-2-pyrrolidone

In addition, the asbestos treatment agent of the present embodiment contains N-methyl-2-pyrrolidone (NMP), which is an organic compound having a 5-membered ring that includes a lactam structure. Specific details are given later, but because the asbestos treatment agent according to the present embodiment contains the NMP, a reaction between the mineral acids mentioned above and asbestos progresses and the asbestos can be detoxified.

Moreover, if the overall mass of the asbestos treatment agent is taken to be 100 wt %, the concentration of NMP is preferably 0.1 to 10 wt %, more preferably 1 to 10 wt %, and particularly preferably 1 to 5 wt %, for example approximately 2.5 wt % (±1 wt %). By using an asbestos treatment agent that contains an appropriate quantity of NMP in this way, asbestos can be more favorably detoxified.

(3) Other Contained Substances

In addition, the asbestos treatment agent according to the present embodiment may contain a variety of components in addition to the mineral acid and NMP mentioned above. Examples of other substances able to be contained in the asbestos treatment agent include water, oxalic acid, tartaric acid, ammonia, glycolic acid and substances containing carboxyl groups, such as glyoxylic acid and formic acid.

2. Method for Detoxifying Asbestos

Figure 1:
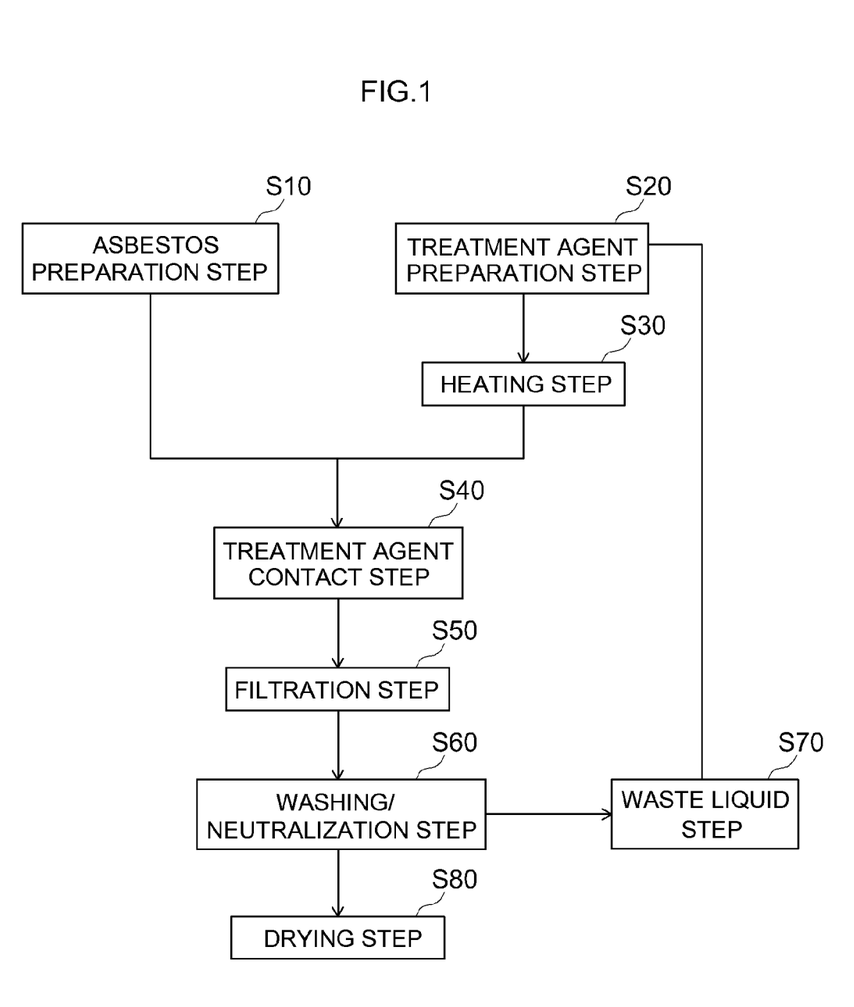
FIG. 1 is a flow chart that explains a method for detoxifying asbestos according to one embodiment of the present invention.

An explanation will now be given of a detoxification method that uses the asbestos treatment agent according to the embodiment described above. FIG. 1 is a flow chart that explains a method for detoxifying asbestos according to the present embodiment.

(1) Asbestos Preparation Step

In the detoxification method according to the present embodiment, an asbestos preparation step S10 is carried out so as to prepare an asbestos-containing substance to be treated, as shown in FIG. 1. In the detoxification method according to the present embodiment, the asbestos-containing substance to be treated is not particularly limited and can be a variety of materials, as long as the substance contains at least one type of asbestos. Examples of this asbestos-containing substance include a variety of construction materials, such as sprayed asbestos obtained by spraying a mixture of asbestos, cement and water, asbestos-containing slate sheets obtained by molding such a mixture into the form of sheets, and asbestos-containing heat insulation materials. In addition, the detoxification method according to the present embodiment can also be used to treat materials other than these construction materials.

Examples of types of asbestos contained in the asbestos-containing substance include chrysotile ($Mg_3Si_2O_5(OH)_4$), amosite (($Fe,Mg)_7Si_8O_{22}(OH)_2$) and crocidolite ($Na_2Fe^{2+}_3Fe^{3+}_2Si_8O_{22}(OH)_2$). In addition, the asbestos-containing substance to be treated in the asbestos treatment method according to the present embodiment may contain a plurality of these types of asbestos. Moreover, among the types of asbestos mentioned above, it has been confirmed through experiments that the detoxification method according to the present embodiment can detoxify chrysotile particularly favorably.

In addition, the asbestos-containing substance may contain a variety of impurities in addition to types of asbestos such as those mentioned above. Examples of such impurities include brucite ($Mg(OH)_2$), quartz ($\alpha$-quartz: $SiO_2$), calcite ($CaCO_3$), magnetite ($Fe_3O_4$), silica ($SiO_2$) and calcium carbonate ($CaCO_3$).

Moreover, it is preferable for the asbestos-containing substance to be treated in the detoxification method according to the present embodiment to be subjected to a fragmentation/pulverization process before carrying out a treatment agent contact step S40, which is described later. By using a powdered asbestos-containing substance obtained using such a fragmentation/pulverization process as substance to be treated, the area of contact between the asbestos treatment agent and the asbestos-containing substance increases, which contributes to a shortening of the treatment time.

In addition, by performing X-Ray diffraction analysis on an asbestos-containing substance that has been subjected to a fragmentation/pulverization process in this way, it was confirmed that the peak half value width increases. As a result, it is understood that distortion occurs in an asbestos-containing substance that has been subjected to a fragmentation/pulverization process, and that reactivity between the asbestos treatment agent and the asbestos-containing substance is further improved as a result of this distortion.

A publicly known means able to be used for fragmentation/pulverization of construction materials or waste materials can be used without particular limitation as the fragmentation/pulverization process for the asbestos-containing substance. For example, in cases where the size of the asbestos-containing substance to be treated is large, it is preferable to carry out a coarse pulverization process in advance using a jaw crusher, an impact crusher, or the like, and then carry out a fine pulverization process using a ball mill, a vibrating mill, or the like. In this way, a powdered asbestos-containing substance having a small particle diameter can be favorably obtained. For example, it is preferable to fragment (pulverize) an asbestos-containing substance so that almost all of the substance to be treated has a particle diameter of several millimeters or less (for example, 1 mm or less). Moreover, from the perspective of adverse effects on the surrounding environment caused by scattering of a powdered asbestos-containing substance, it is preferable for the fragmentation/pulverization process to be carried out in a sealed environment or a humid environment.

(2) Treatment Agent Preparation Step

In the detoxification method according to the present embodiment, an asbestos treatment agent containing a mineral acid and NMP is next prepared (a treatment agent preparation step S20).

In the present step, the preparation means is not particularly limited as long as an asbestos treatment agent containing a mineral acid and NMP can be prepared. For example, an asbestos treatment agent can be prepared by mixing a mineral acid mentioned above with NMP, or by separately preparing asbestos treatment agents prepared in advance. In addition, components of a spent asbestos treatment agent (a residual liquid) recovered in a filtration step S50, which is described later, may be modified and re-used.

(3) Heating Step

In addition, in the detoxification method according to the present embodiment, a heating step S30 for heating the asbestos treatment agent is carried out before bringing the asbestos treatment agent into contact with the asbestos-containing substance. By heating the asbestos treatment agent in advance prior to use in this way, reactivity of the mineral acid in the asbestos treatment agent can be improved and the time required for detoxification can be shortened.

Moreover, the temperature of the asbestos treatment agent in the heating step S30 is preferably set to 50° C. or higher, and more preferably set to 60° C. or higher (for example, 70° C.). Meanwhile, because the reactivity of the mineral acid becomes excessively high and safety problems occur if the asbestos treatment agent is excessively heated, in cases where the heating step S30 is carried out, it is preferable for the temperature of the asbestos treatment agent to be lower than the boiling point thereof (for example, 80° C. or lower).

Moreover, the means for heating the asbestos treatment agent in the present step is not particularly limited, and a variety of conventional publicly known means can be used. Examples of such heating means include heaters and microwaves.

(4) Treatment Agent Contact Step

In the detoxification method according to the present embodiment, a treatment agent contact step S40 for bringing the asbestos-containing substance into contact with the asbestos treatment agent is next carried out. By carrying out the present step, the asbestos-containing substance reacts with the asbestos treatment agent and asbestos in the asbestos-containing substance is detoxified.

Here, by using an asbestos treatment agent that contains a mineral acid and NMP, as in the present embodiment, asbestos in an asbestos-containing substance can be detoxified more favorably than in the past. Although not particularly limited, it is preferable to adjust the quantity ratio of the asbestos-containing substance and the asbestos treatment agent so that the quantity of asbestos to be treated is approximately 5 to 50 g (for example, 10 to 30 g) relative to 100 mL of an asbestos treatment agent containing, for example, 10 to 30 wt % of sulfuric acid ($H_2SO_4$) as a mineral acid.

An explanation will now be given using an example of a reaction in a case in which chrysotile is used as the asbestos to be treated and sulfuric acid is used as the mineral acid in the asbestos treatment agent. Moreover, the explanation given below is not intended to be limited in terms of the type of mineral acid or asbestos to be treated, and the detoxification method disclosed here can be appropriately altered if necessary according to the type of asbestos or mineral acid being used.

In cases where an asbestos-containing substance that contains chrysotile and an asbestos treatment agent that contains sulfuric acid are brought into contact with each other and reacted, it is surmised that a reaction such as that shown in formula (1) below takes place.

$$Mg_3Si_2O_5(OH)_4 + 3H_2SO_4 \rightarrow 3MgSO_4 + 2SiO_2 + 5H_2O \qquad (1)$$

However, when an asbestos-containing substance that had been subjected to the present step (hereinafter referred to as a "treated product") was analyzed by the inventors of the present invention, almost no chrysotile was present due to having been detoxified, but magnesium sulfate ($MgSO_4$), which is produced when chrysotile and sulfuric acid react, was not identified. In addition, it was confirmed that caminite ($MgSO_4(Mg(OH)_2)_{0.33}(H_2O)_{0.33}$) was produced instead of magnesium sulfate ($MgSO_4$) in the treated product.

Therefore, in cases where an asbestos treatment agent containing a mineral acid and NMP is used, as in the detoxification method according to the present embodiment, because the NMP contributes to progression of the reaction between the mineral acid and asbestos, it is surmised that the asbestos detoxification reaction progresses further and the asbestos is favorably detoxified.

Moreover, it is preferable for the present step to be carried out continuously for a prescribed period of time so that the asbestos and the asbestos treatment agent can react well. Specifically, the period of contact between the asbestos-containing substance and the asbestos treatment agent in the present embodiment is preferably 30 minutes or longer, more preferably 1 hour or longer, and particularly preferably 1 to 2 hours (for example, 1.5 hours). By setting the period of contact between the asbestos-containing substance and the asbestos treatment agent in this way, the asbestos and the asbestos treatment agent react with each other well and the asbestos can be rapidly and favorably detoxified.

(5) Filtration Step

In the present embodiment, a filtration step S50 for filtering the treated product is then carried out after the treatment agent contact step S40. For example, a prescribed filtration apparatus such as a pressure filter (for filter press) can be used without particular limitation in the filtration step S50.

Moreover, by recovering spent asbestos treatment agent (a residual liquid) separated in the present step and modifying components in the recovered residual liquid in the detoxification method according to the present embodiment, as mentioned above, the residual liquid can be reused as an asbestos treatment agent. Constituting in this way can contribute to a reduction in treatment costs and the burden on the environment.

(6) Washing/Neutralization Step

In the present embodiment, a washing/neutralization step S60 for washing and neutralizing the treated product is carried out after the filtration step S50. In this washing/neutralization step S60, it is preferable to repeat multiple times a treatment involving, for example, dispersing the treated product in a washing liquid such as water and then re-filtering.

Moreover, in view of the burden on the environment, the washing liquid used in the present step is preferably discarded after being subjected to a waste liquid step S70 including adding a coagulant, a neutralizing agent, or the like, and then removing precipitates and the like.

(7) Drying Step

In the detoxification method according to the present embodiment, a drying step S80 for drying the treated product is carried out after the washing/neutralization step S60 mentioned above. Because asbestos has been reliably detoxified in the thus obtained treated product, the treated product has no adverse effects on humans or the environment and can be safely and easily discarded by means of a method such as burial.

In addition, the treated product produced by the detoxification method according to the present embodiment contains large quantities of gypsum, and because asbestos has been reliably removed, the treated product can be reused as a gypsum-containing construction material. In other words, the detoxification method according to the present embodiment can be carried out as a method for producing a gypsum-containing construction material.

Although a detailed explanation is omitted here, the inventors of the present invention carried out the detoxification method according to the present embodiment and then confirmed whether or not asbestos (for example, chrysotile) was present in a treated product using a variety of means, such as X-Ray diffraction, a phase contrast microscope and a transmission electron microscope (TEM), but the presence of asbestos having a needle-like crystal structure was not observed when using any of these means for confirmation.

Therefore, it was confirmed that use of an asbestos treatment agent containing a mineral acid and NMP in the detoxification method according to the present embodiment can rapidly and reliably detoxify asbestos in an asbestos-containing substance and can greatly contribute to a reduction in adverse effects on humans and the environment by asbestos.

3. Other Embodiments

An explanation has been given above of a method for detoxifying asbestos according to one embodiment of the present invention. However, the method for detoxifying asbestosis disclosed here is not limited to the embodiment described above, and a variety of modifications may be carried out.

For example, the heating step S30 for heating the asbestos treatment agent in advance is carried out in the detoxification method according to the embodiment described above, as shown in FIG. 1, but this heating step S30 may be omitted. Specifically, even in cases where the asbestos treatment agent is used at normal temperature, asbestos in an asbestos-containing substance can be detoxified well. However, it is preferable to heat the asbestos treatment agent in advance, as in the embodiment described above, in order to exponentially improve the reactivity of the mineral acid. In addition, it is not essential to separately provide the heating step and the treatment agent contact step, as in the embodiment mentioned above, and it is possible, for example, to heat the asbestos treatment agent while carrying out the treatment agent contact step.

In addition, the filtration step S50, the washing step S60, the waste liquid step S70 and the drying step S80 are carried out after carrying out the treatment agent contact step S40 in the embodiment described above.

However, the detoxification method disclosed here should include a step for preparing an asbestos-containing substance (an asbestos preparation step), a step for preparing an asbestos treatment agent that contains a mineral acid and NMP (a treatment agent preparation step) and a step for bringing the asbestos treatment agent into contact with an asbestos-containing substance (a treatment agent contact step), and steps other than these may be appropriately altered according to treatment facilities and the treatment environment.

EXPERIMENTAL EXAMPLES

Explanations will now be given of several experimental examples relating to the present invention. Moreover, the present invention is not intended to be limited to the experimental examples below.

First Experiment

In the present experiment, asbestos in an asbestos-containing substance was detoxified using an asbestos treatment agent containing a mineral acid and N-methyl-2-pyrrolidone, and the composition of the treated product was investigated.

1. Detoxification Procedure

In the present experiment, an asbestos treatment agent containing 25 wt % of sulfuric acid and 25 mg/L of NMP was first prepared using water as a medium, and this asbestos treatment agent was then heated to 70° C. Next, a powdered asbestos-containing substance containing chrysotile as a primary component and adjusted to a particle diameter of several millimeters or less (approximately 1 mm or less) (hereinafter referred to as a "chrysotile standard sample") was prepared, and this chrysotile standard sample was mixed with the asbestos treatment agent and held for 2 hours while being stirred. The mixed liquid was then subjected to centrifugal separation, the settled solid treated product (residue) was collected, and this treated product was washed with water and then dried.

2. Evaluation Experiments

In the present experiment, the composition of the treated product obtained by means of the detoxification mentioned above was investigated using the following evaluation experiments.

Figure 2:
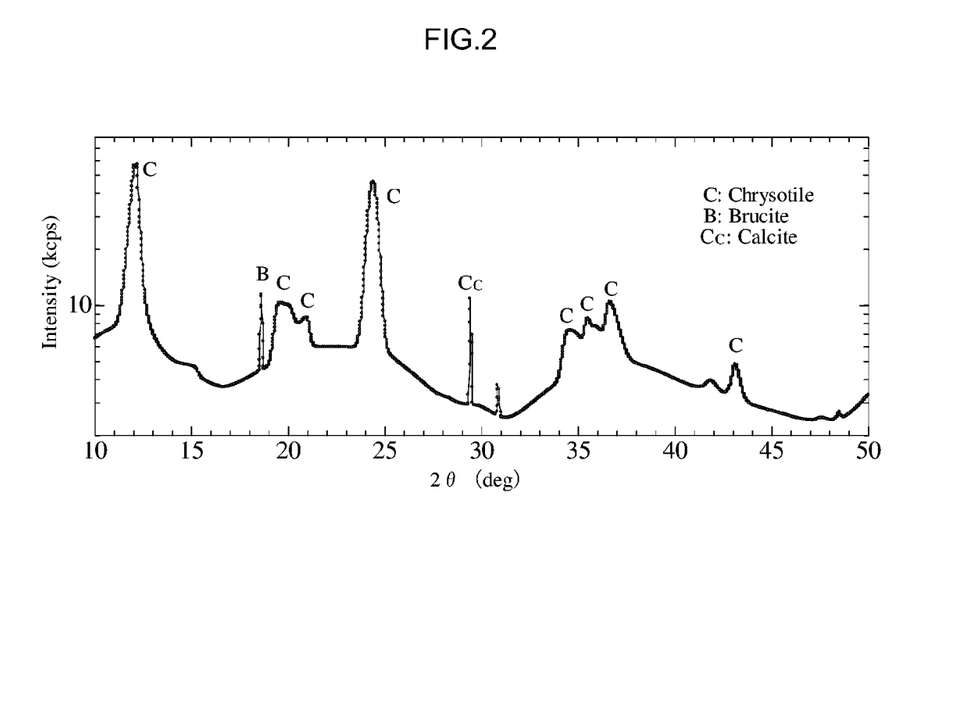
FIG. 2 is a diagram that shows X-Ray diffraction results for a chrysotile standard sample used in the first experiment.
Figure 3:
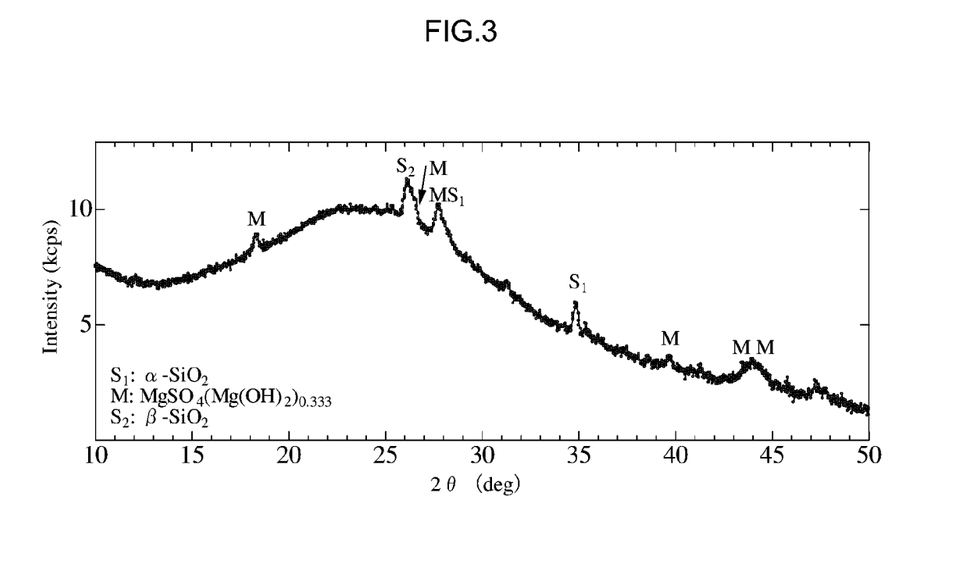
FIG. 3 is a diagram that shows X-Ray diffraction results for a treated product following detoxification in the first experiment.

In the present evaluation experiment, the chrysotile standard sample prior to detoxification and the treated product following detoxification were subjected to X-Ray diffraction analysis, and the compounds contained in the standard sample and the treated product were analyzed. In this X-Ray diffraction analysis, an X-Ray diffraction apparatus available from Rigaku Corporation (Ultima IX) was used and a copper anticathode tube that generates Cu-K$\alpha$ rays was used as the X-Ray source. In addition, X-Ray diffraction analysis was carried out at a tube voltage of 40 kV and a tube current of 40 mA, and observed X-Ray diffraction peaks were identified using X-Ray diffraction database software (ICCD: International center for Diffraction data). X-Ray diffraction analysis data for the chrysotile standard sample used in the first experiment is shown in FIG. 2, and X-Ray diffraction analysis data for the treated product following detoxification in the first experiment is shown in FIG. 3. Moreover, in the X-Ray diffraction analysis results shown in the present specification, the vertical axis is a logarithmic scale in order to accurately confirm peaks having weak diffraction intensities.

As shown in FIG. 2, the chrysotile standard sample prior to detoxification showed strong peaks derived from chrysotile at 12.1° and 24.4° (see "C" in FIG. 2). In addition, a peak derived from brucite (see "B" in FIG. 2) and a peak derived from calcite (see "Cc" in FIG. 2) were observed in the chrysotile standard sample. Therefore, it was confirmed that the chrysotile standard sample used in the present experiment contained brucite and calcite as impurities in addition to chrysotile.

However, in the X-Ray diffraction analysis results for the treated product following detoxification shown in FIG. 3, surprising results were obtained, namely that peaks derived from chrysotile, such as those mentioned above, had almost completely disappeared. Therefore, it was confirmed that by bringing an asbestos treatment agent containing sulfuric acid (a mineral acid) and NMP into contact with the chrysotile standard sample (an asbestos-containing substance), asbestos in the asbestos-containing substance can be detoxified.

In addition, in the treated product following detoxification, peaks derived from caminite ($MgSO_4(Mg(OH)_2)_{0.333}$) (see "M" in FIG. 3), peaks derived from $\alpha$-$SiO_2$ (see "$S_1$" in FIG. 3) and a peak derived from $\beta$-$SiO_2$ (see "$S_2$" in FIG. 3) were confirmed.

In cases where chrysotile reacts with sulfuric acid, it is surmised that magnesium sulfate ($MgSO_4$) is generally contained in a treated product. However, magnesium sulfate was not contained in the treated product following detoxification in the present experimental example (peaks at 24.6°, 25.2°, 33.4° and 36.7° derived from magnesium sulfate were not observed). Therefore, it is surmised that an asbestos detoxification reaction progresses better by reacting asbestos with a mineral acid in the presence of NMP.

Second Experiment

In order to investigate the effect of NMP on asbestos detoxification in the present experiment, three asbestos treatment agents having different NMP concentrations were prepared, and asbestos in asbestos-containing substances was detoxified using these asbestos treatment agents.

1. Explanation of Samples

(1) Example 1

In Example 1, chrysotile contained in an asbestos-containing substance was detoxified using 25 wt % of sulfuric acid as an asbestos treatment agent. In other words, the asbestos treatment agent used in Example 1 did not contain NMP (NMP concentration: 0 wt %).

In addition, in the present experiment, a "cotton-like chrysotile-containing construction material for spraying" was used as the asbestos-containing substance to be treated, and the cotton-like chrysotile-containing construction material for spraying was prepared as a powder having a particle diameter of several millimeters or less (approximately 1 mm or less). Moreover, other treatment procedures were carried out under the same conditions as those used in the first experiment described above.

(2) Example 2

In Example 2, chrysotile contained in a cotton-like chrysotile-containing construction material for spraying was detoxified under the same conditions as those used in Example 1, except that an asbestos treatment agent containing 25 wt % of sulfuric acid and 1 wt % of NMP was used.

(3) Example 3

In Example 3, chrysotile contained in a cotton-like chrysotile-containing construction material for spraying was detoxified under the same conditions as those used in Example 1, except that an asbestos treatment agent containing 25 wt % of sulfuric acid and 10 wt % of NMP was used.

2. Evaluation Experiments

Figure 4:
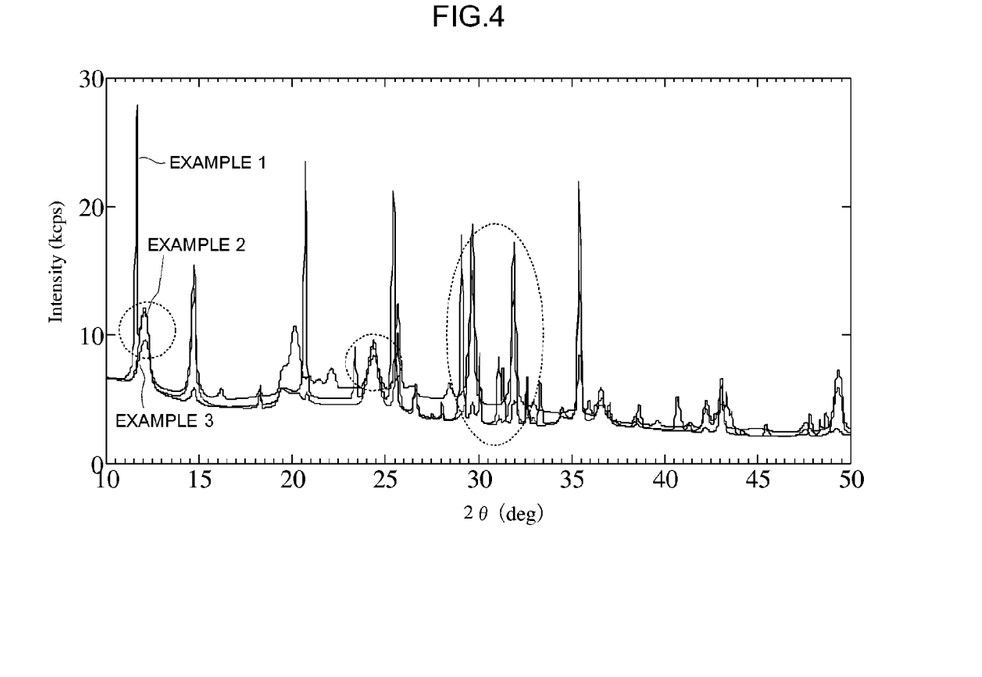
FIG. 4 is a diagram that shows X-Ray diffraction results for treated products in Examples 1 to 3 in the second experiment.

In the present experiment, the treated product following detoxification was subjected to X-Ray diffraction analysis. Moreover, the X-Ray diffraction analysis conditions were the same as those used in the first experiment above. X-Ray diffraction analysis results for the treated products in Examples 2 to 3 are shown in FIG. 4. In addition, FIG. 5 is a diagram showing an enlargement of the 28° to 34° region of the X-Ray diffraction results shown in FIG. 4.

As shown in FIG. 4, peaks derived from chrysotile (peaks at 12.1° and 24.4°) were observed in Example 1, in which an asbestos treatment agent made only of sulfuric acid was used. And, peaks derived from chrysotile had disappeared in Examples 2 and 3, in which asbestos treatment agents containing a mineral acid and NMP were used. Therefore, it is understood that an asbestos treatment agent containing a mineral acid and NMP, unlike an asbestos treatment agent made only of sulfuric acid, can reliably detoxify asbestos in asbestos-containing substances. In addition, it was understood that cases where the concentration of NMP in the asbestos treatment agent is at least 1 to 10 wt % can reliably detoxify asbestos.

Figure 5:
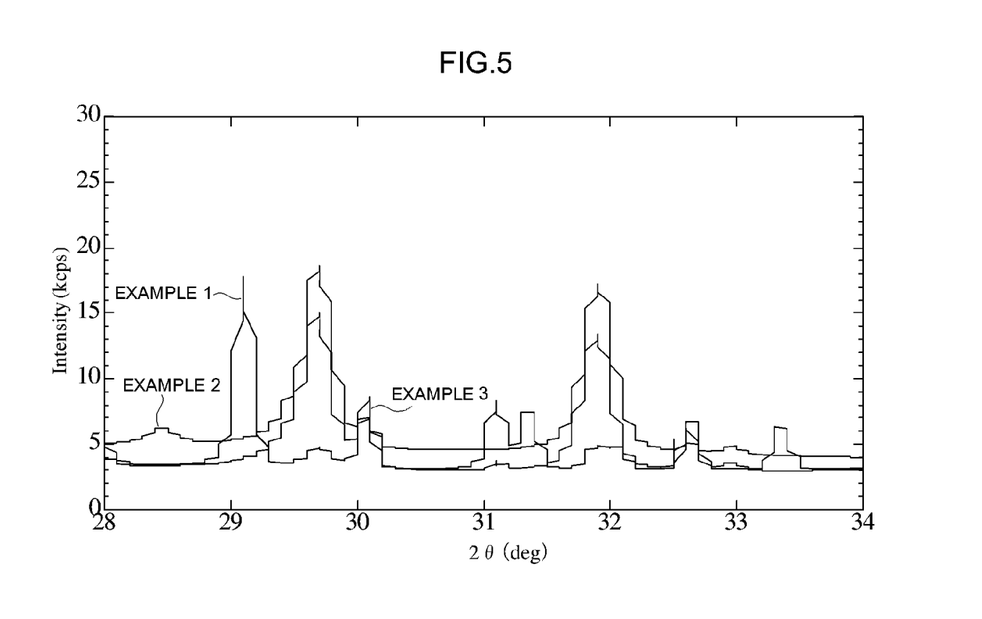
FIG. 5 is a diagram showing an enlargement of the 28° to 34° region of the X-Ray diffraction results shown in FIG. 4.

In addition, strong peaks at 29.6° and 31.8° were observed in Examples 2 and 3, in which NMP-containing asbestos treatment agents were used, as shown in FIG. 5. This is understood to be because impurities (calcium carbonate and the like) contained in the cotton-like chrysotile-containing construction material for spraying react with the NMP-containing asbestos treatment agent, thereby generating $Ca(SO_4)_2(H_2O)$ and $Ca(SO_4)(H_2O)_{0.5}$.

Third Experiment

Tests relating to the period of contact between an asbestos treatment agent and an asbestos-containing substance were carried out in the present experiment.

1. Explanation of Samples (1) Example 4

In Example 4, chrysotile contained in asbestos-containing substance (a chrysotile standard sample) was detoxified using an asbestos treatment agent containing 25 wt % of sulfuric acid and 2.5 mg/L of NMP. Here, the period of contact between the asbestos treatment agent and the asbestos-containing substance (the holding time following mixing) was set to be 10 minutes. Moreover, other treatment procedures were carried out under the same conditions as those used in the first experiment described above.

(2) Example 5

In Example 5, chrysotile contained in a chrysotile standard sample was detoxified under the same conditions as those used in Example 4, except that the period of contact between the asbestos treatment agent and the chrysotile standard sample was changed to 30 minutes.

(3) Example 6

In Example 6, chrysotile contained in a chrysotile standard sample was detoxified under the same conditions as those used in Example 4, except that the period of contact between the asbestos treatment agent and the chrysotile standard sample was changed to 1 hour.

(4) Example 7

In Example 7, chrysotile contained in a chrysotile standard sample was detoxified under the same conditions as those used in Example 4, except that the period of contact between the asbestos treatment agent and the chrysotile standard sample was changed to 2 hours.

(5) Example 8

In Example 8, chrysotile contained in a chrysotile standard sample was detoxified under the same conditions as those used in Example 4, except that the period of contact between the asbestos treatment agent and the chrysotile standard sample was changed to 4 hours.

2. Evaluation Experiments

In the present experiment, treated products following detoxification in Examples 5 to 8 were subjected to X-Ray diffraction analysis. Moreover, the X-Ray diffraction analysis conditions were the same as those used in the first experiment above.

Figure 6:
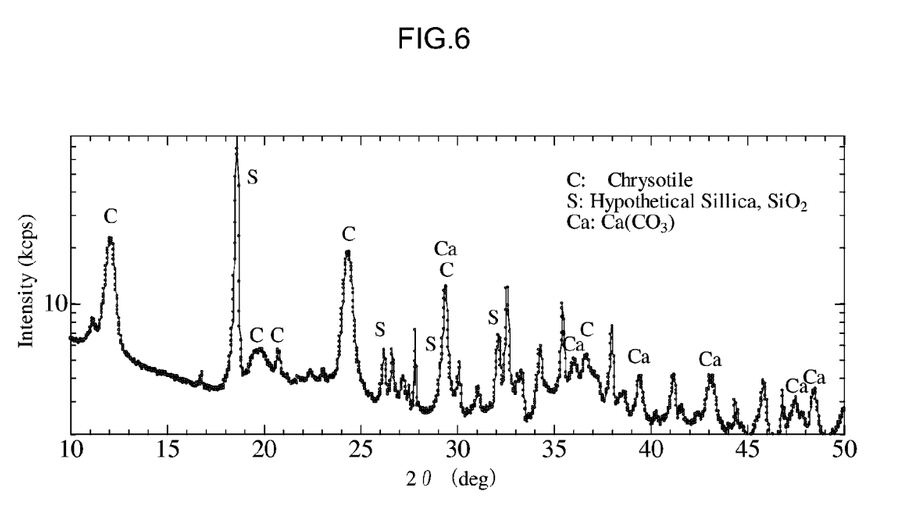
FIG. 6 is a diagram that shows X-Ray diffraction results for a chrysotile standard sample used in the third experiment.
Figure 7:
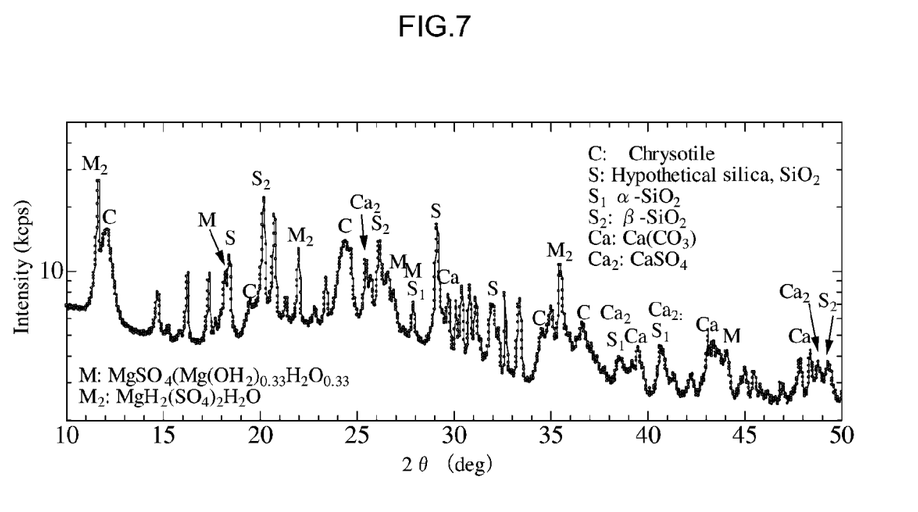
FIG. 7 is a diagram that shows X-Ray diffraction results for a treated product following detoxification in Example 4.
Figure 8:
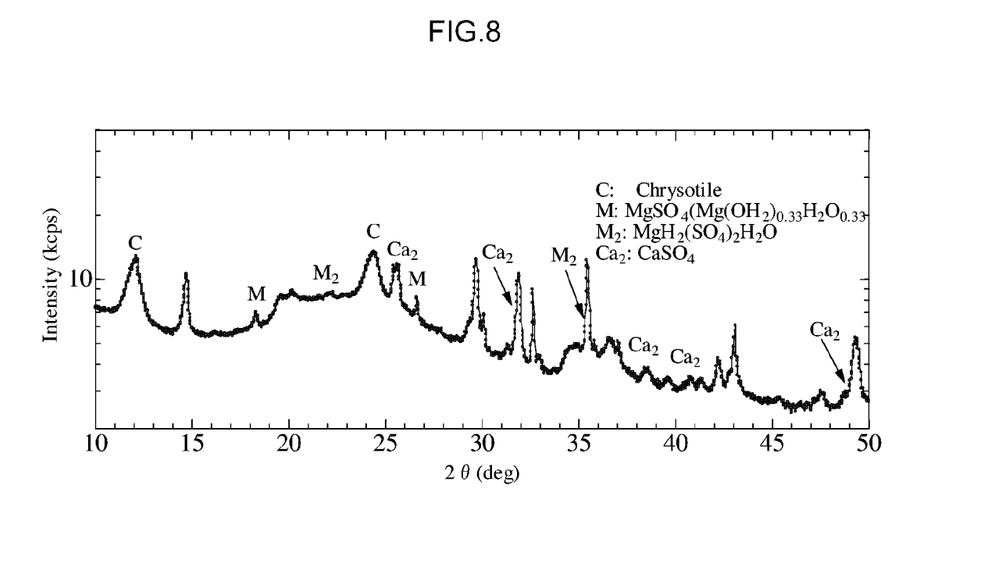
FIG. 8 is a diagram that shows X-Ray diffraction results for a treated product following detoxification in Example 5.
Figure 9:
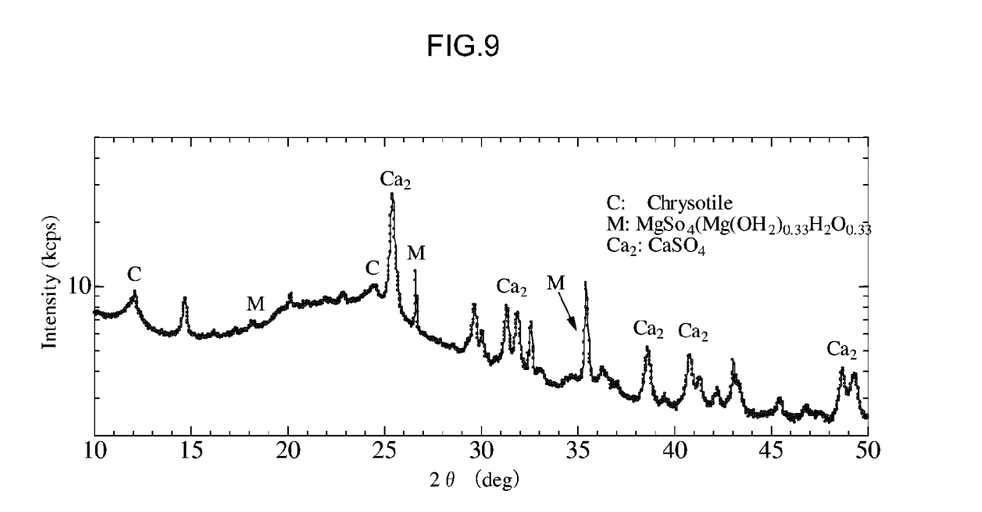
FIG. 9 is a diagram that shows X-Ray diffraction results for a treated product following detoxification in Example 6.
Figure 10:
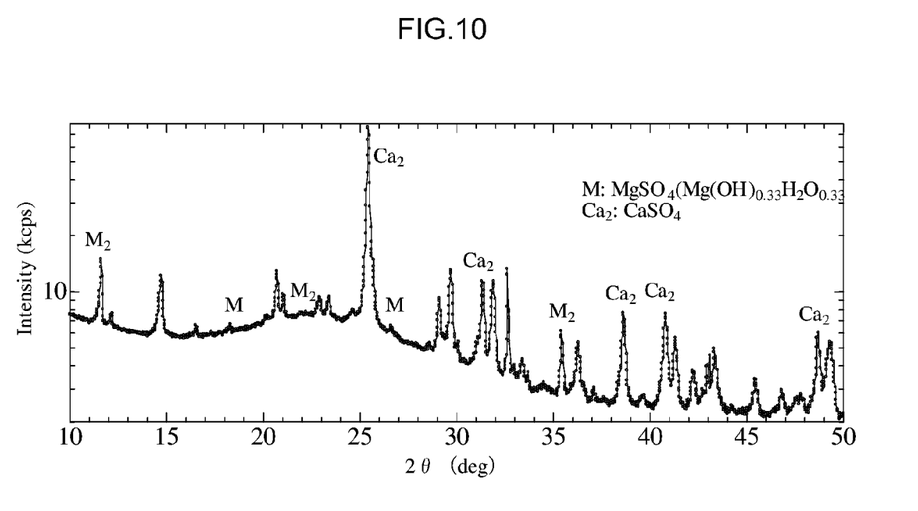
FIG. 10 is a diagram that shows X-Ray diffraction results for a treated product following detoxification in Example 7.
Figure 11:
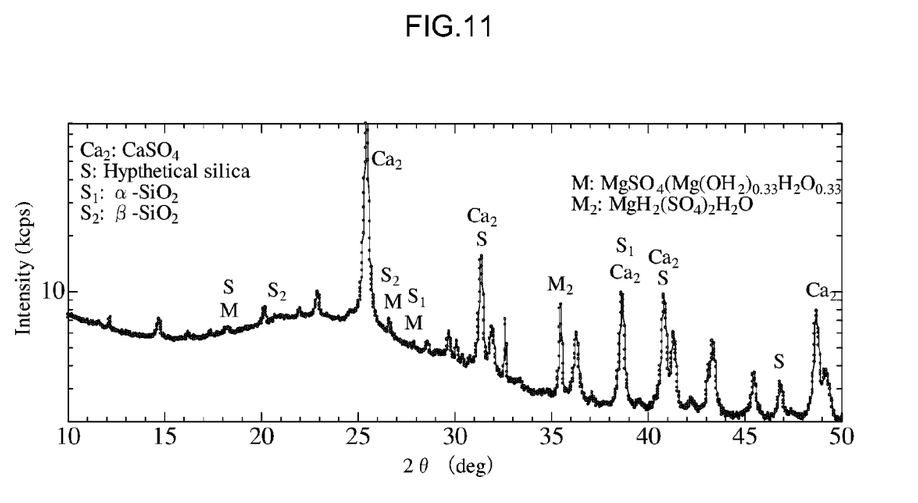
FIG. 11 is a diagram that shows X-Ray diffraction results for a treated product following detoxification in Example 8.
Figure 12:
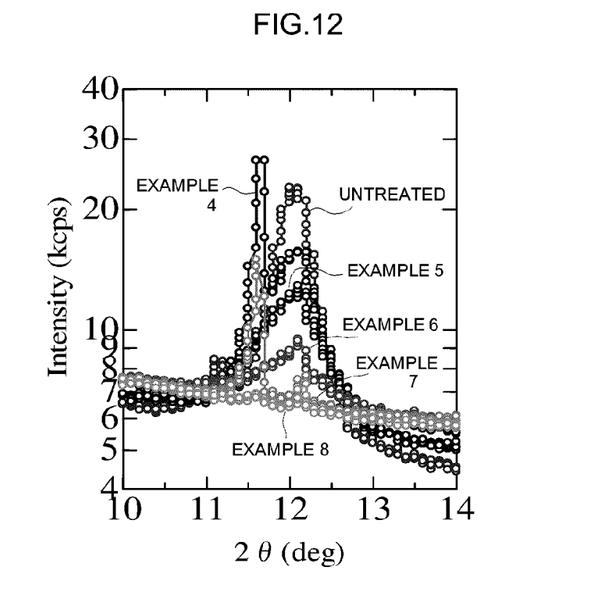
FIG. 12 is a diagram showing an enlargement of the 10° to 14° region of the X-Ray diffraction results for a chrysotile standard sample prior to detoxification and treated products following detoxification in Examples 4 to 8.
Figure 13:
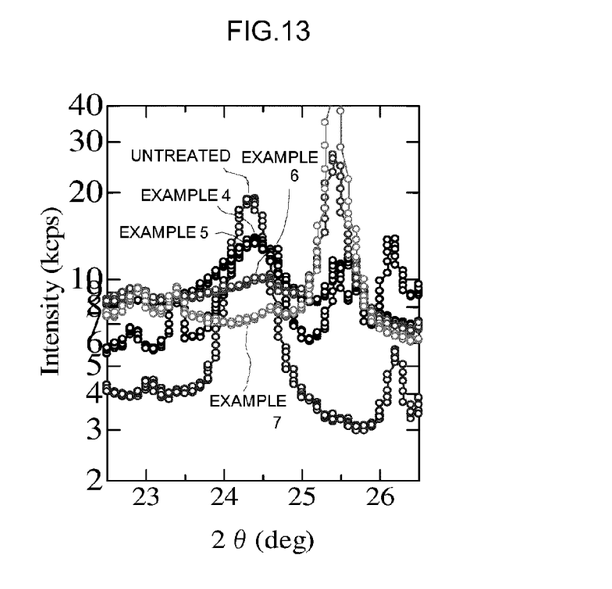
FIG. 13 is a diagram showing an enlargement of the 22.5° to 26.5° region of the X-Ray diffraction results for a chrysotile standard sample prior to detoxification and treated products following detoxification in Examples 4 to 7.

FIG. 6 shows X-Ray diffraction results for a chrysotile standard sample prior to detoxification. In addition, FIGS. 7 to 11 are diagrams that show X-Ray diffraction results for treated products following detoxification in Examples 4 to 8. In addition, FIG. 12 shows an enlargement of the 10° to 14° region of the X-Ray diffraction results for an untreated chrysotile standard sample and treated products following detoxification in Examples 4 to 8, and FIG. 13 shows an enlargement of the 22.5° to 27.5° region of the X-Ray diffraction results for an untreated chrysotile standard sample and treated products following detoxification in Examples 4 to 7.

First, as a result of subjecting a chrysotile standard sample prior to detoxification to X-Ray diffraction analysis, it was confirmed that the chrysotile standard sample used in the present experiment contained $SiO_2$ (see "S" in FIG. 6) and $Ca(CO_3)$ (see "Ca" in FIG. 6) as impurities in addition to chrysotile (see "C" in FIG. 6), as shown in FIG. 6.

In addition, in all of Examples 4 to 8, in which detoxification was carried out using asbestos treatment agents containing sulfuric acid and NMP, the intensity of peaks derived from chrysotile was lower than in the chrysotile standard sample prior to detoxification, as shown in FIGS. 7 to 11, and it was confirmed that $MgSO_4(Mg(OH)_2)_{0.33}(H_2O)_{0.33}$ (see "M" in the diagrams) and $MgH_2(SO_4)_2 H_2O$ (see "$M_2$" in the diagrams) were produced.

In addition, the presence of $SiO_2$ (see "S" in the diagrams), $\alpha$-$SiO_2$ (see "$S_1$" in the diagrams), $\beta$-$SiO_2$ (see "$S_2$" in the diagrams), $Ca(CO_3)$ (see "Ca" in the diagrams), $CaSO_4$ (see "$Ca_2$" in the diagrams), and the like, was also confirmed in Examples 4 to 8.

In addition, comparing Examples 4 to 8, in which the period of contact between an asbestos treatment agent and an asbestos-containing substance was varied, it was confirmed that the intensity of peaks derived from chrysotile (at 12.1° and 24.4°) decreased as the period of contact increased as shown in FIGS. 12 and 13. In addition, peaks derived from chrysotile had disappeared in Examples 7 and 8, in which the period of contact was 2 hours or longer. Therefore, in cases where an asbestos treatment agent containing a mineral acid and NMP was used, it was confirmed that chrysotile could be reliably detoxified by setting the period of contact between the asbestos treatment agent and the asbestos-containing substance to be 2 hours or longer.

Fourth Experiment

In the present experiment, detoxification results were investigated for cases in which asbestos-containing slates were used as a substance to be treated (an asbestos-containing sub stance).

1. Explanation of Samples (1) Example 9

In Example 9, the same conditions were used as in Example 4 in the third experiment, except that asbestos-containing slates containing chrysotile were used as the asbestos-containing substance to be detoxified. Moreover, the asbestos-containing slates used here were obtained by compression molding a mixture containing mainly chrysotile and cement into the form of sheets. Moreover, in the present experiment, a powdered asbestos-containing substance having an average particle diameter of 1 mm or less was obtained by coarsely pulverizing these asbestos-containing slates using a shredder (available from Niihama), then finely pulverizing using a similar shredder, and then sorting by means of a sieve. Next, this powdered asbestos-containing substance was brought into contact with an asbestos treatment agent containing sulfuric acid and NMP.

(2) Example 10

In Example 10, chrysotile contained in asbestos-containing slates was detoxified under the same conditions as those used in Example 9, except that the period of contact between the asbestos treatment agent and the asbestos-containing slates was changed to 30 minutes.

(3) Example 11

In Example 11, chrysotile contained in asbestos-containing slates was detoxified under the same conditions as those used in Example 9, except that the period of contact between the asbestos treatment agent and the asbestos-containing slates was changed to 1 hour.

(4) Example 12

In Example 12, chrysotile contained in asbestos-containing slates was detoxified under the same conditions as those used in Example 9, except that the period of contact between the asbestos treatment agent and the asbestos-containing slates was changed to 2 hours.

(5) Example 13

In Example 13, chrysotile contained in asbestos-containing slates was detoxified under the same conditions as those used in Example 9, except that the period of contact between the asbestos treatment agent and the asbestos-containing slates was changed to 4 hours.

2. Evaluation Experiments

Figure 14:
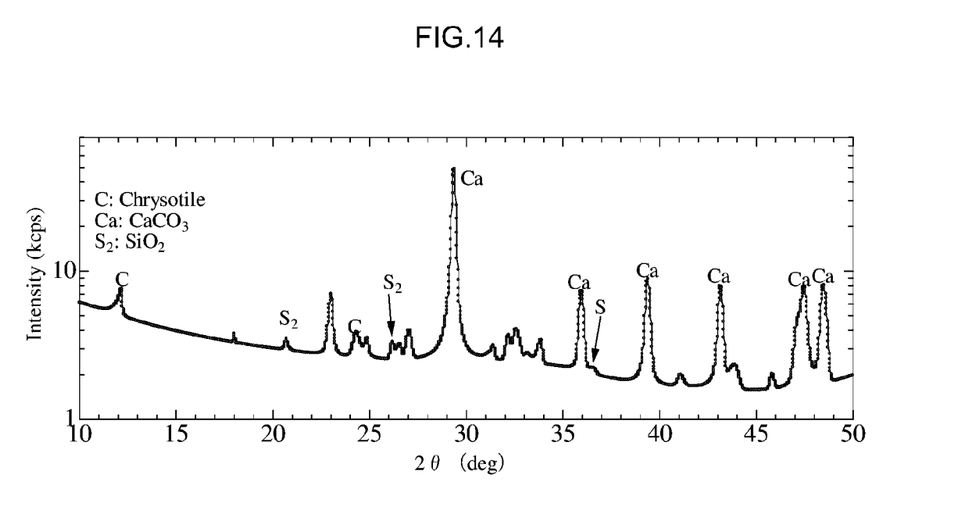
FIG. 14 is a diagram that shows X-Ray diffraction results for an asbestos-containing slate used in the fourth experiment.
Figure 15:
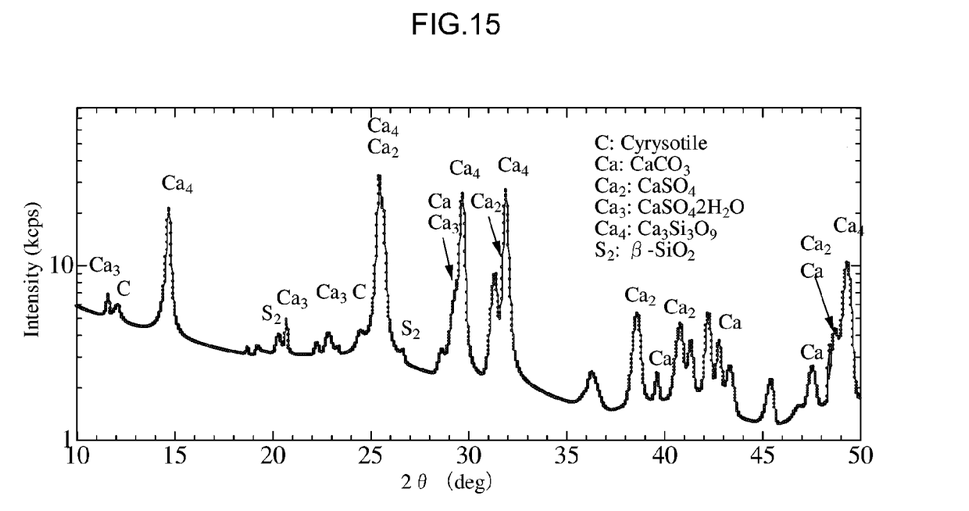
FIG. 15 is a diagram that shows X-Ray diffraction results for a treated product following detoxification in Example 9.
Figure 16:
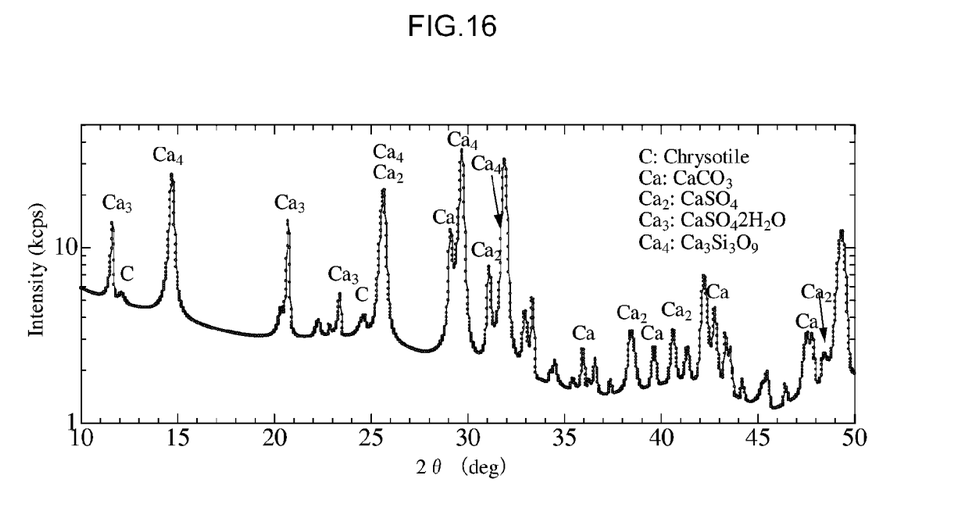
FIG. 16 is a diagram that shows X-Ray diffraction results for a treated product following detoxification in Example 10.
Figure 17:
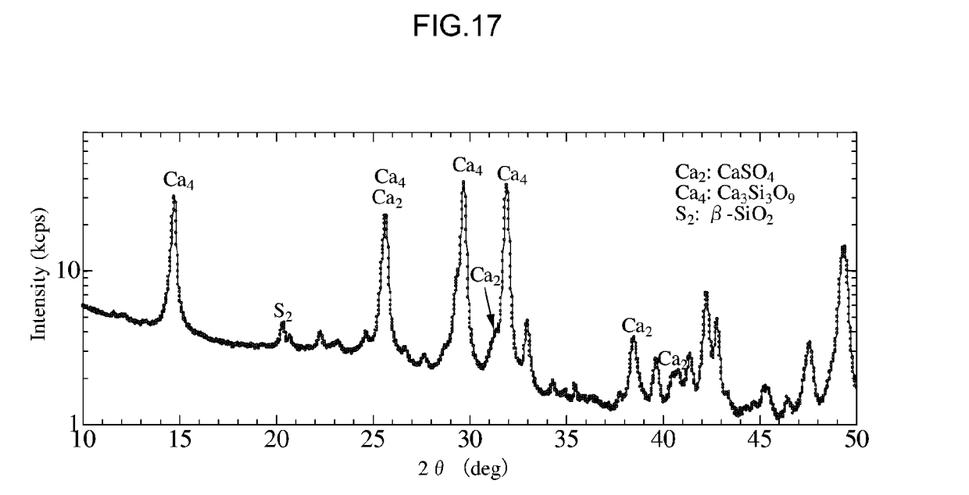
FIG. 17 is a diagram that shows X-Ray diffraction results for a treated product following detoxification in Example 11.
Figure 18:
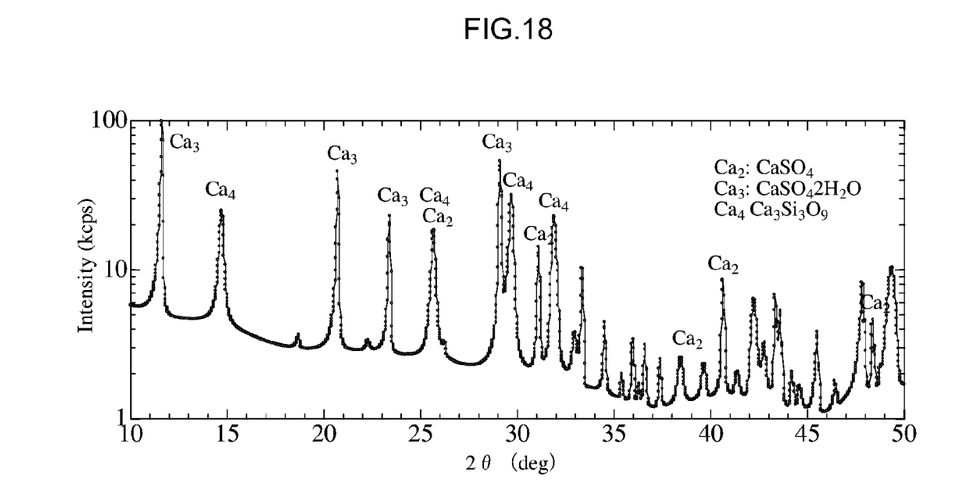
FIG. 18 is a diagram that shows X-Ray diffraction results for a treated product following detoxification in Example 12.
Figure 19:
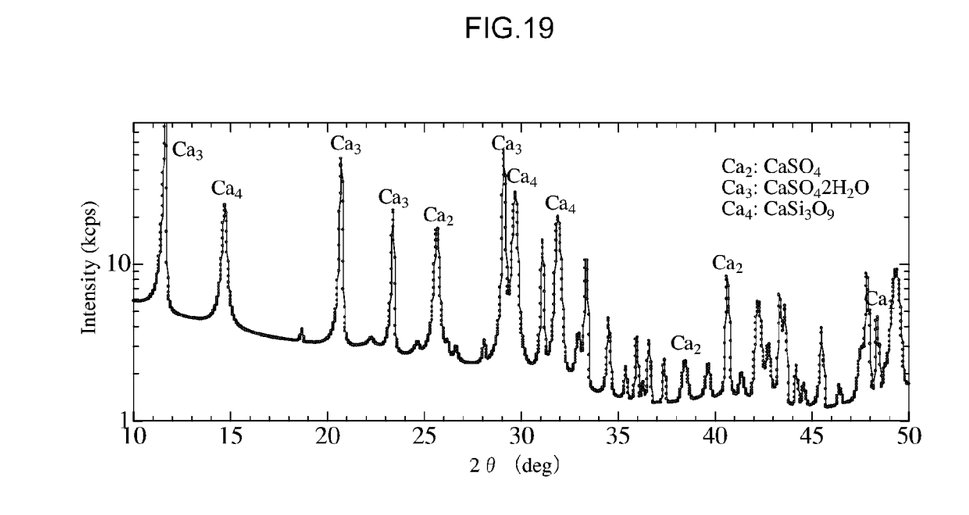
FIG. 19 is a diagram that shows X-Ray diffraction results for a treated product following detoxification in Example 13.

In the present experiment, asbestos-containing slates prior to detoxification and asbestos-containing slates following detoxification in Examples 9 to 13 (treated products) were subjected to X-Ray diffraction analysis using a similar procedure to that used in the first experiment above. FIG. 14 shows X-Ray diffraction results for an asbestos-containing slate used in the fourth experiment and FIGS. 15 to 19 show X-Ray diffraction results for treated products following detoxification in Examples 9 to 13.

First, as a result of subjecting asbestos-containing slates prior to detoxification to X-Ray diffraction analysis, it was confirmed that the asbestos-containing slates used in the present experiment contained $SiO_2$ (see "S" in FIG. 14) and $CaCO_3$ (see "Ca" in FIG. 14) as impurities in addition to chrysotile (see "C" in FIG. 14), as shown in FIG. 14.

In addition, it was confirmed that the intensity of peaks derived from chrysotile (at 12.1° and 24.4°) decreased in Examples 9 to 13, as shown in FIGS. 15 to 19. In particular, peaks derived from chrysotile had disappeared in Examples 11 to 13, in which the treatment time was 1 hour or longer. Therefore, even in cases where the substance to be treated was changed to asbestos-containing slates, it was confirmed that a treatment agent containing sulfuric acid and NMP can favorably detoxify asbestos in such a substance to be treated.

Fifth Experiment

In the present experiment, the presence or absence of asbestos in a detoxified product obtained using an asbestos treatment agent containing a mineral acid and NMP was analyzed using means other than the X-Ray diffraction analysis described above.

1. Explanation of Samples

In the present experiment, a treated product obtained by detoxifying asbestos (chrysotile) using the same procedure as that used in the first experiment was investigated. That is, in the present experiment, chrysotile was detoxified by heating an asbestos treatment agent containing 25 wt % of sulfuric acid and 25 mg/L of NMP to 70° C., mixing the asbestos treatment agent with a chrysotile standard sample, and holding the mixture for 2 hours while stirring. After 2 hours had passed, the mixed liquid was subjected to centrifugal separation, the settled solid treated product (residue) was collected, and this treated product was washed with water and then dried.

2. Evaluation Experiments

In the present experiment, a treated product following detoxification was first subjected to TEM observations, and it was confirmed whether or not fibrous substances were contained in the treated product.

Specifically, the treated product was dispersed in water (dust-free water) using ultrasonic wave dispersion (2 minutes, twice), and the thus obtained dispersion liquid was filtered using a filter (opening size: 0.075 mm) and then filtered again using a polycarbonate filter paper (opening size: 0.2 μm). Next, carbon was deposited on the filter paper mentioned above using a vacuum deposition apparatus (SVC-700TMSG/7PS80-FC available from Sanyu Electron Co., Ltd.), and the carbon-deposited filter paper was placed on a TEM grid (made of nickel). The filter paper was then removed by being dissolved in chloroform. In this state, observations were carried out using a transmission electron microscope (JEM2100F available from JEOL Ltd.), and it was investigated whether or not fibrous substances were present in the treated product. Moreover, in the present experiment, the accelerating voltage in the TEM observations was set to 120 kV, and the treated product was observed while altering the magnification ratio between 5,000 times and 100,000 times.

Next, in the present experiment, constituent elements in fibrous substances confirmed in the treated product were analyzed by TEM-EDS (spot diameter: 15 nm), and the presence or absence of crystallinity was analyzed using selected area electron diffraction (SAED).

As a result of TEM observations carried out under the conditions mentioned above, it was confirmed that the treated product contained fibrous substances. However, as a result of analyzing constituent elements in these fibrous substances by means of TEM-EDS, it was understood that these fibrous substances did not contain constituent elements of chrysotile (Mg, Si, and the like) and were therefore not chrysotile. Furthermore, when these fibrous substances were analyzed by means of selected area electron diffraction, diffraction spots did not match, and it was understood that the fibrous substances did not have crystal structures (were amorphous fibrous substances). From these results, it was confirmed that in cases where chrysotile is detoxified using an asbestos treatment agent containing sulfuric acid and NMP, the treated product does not contain chrysotile, which has a needle-like crystal structure.

Specific examples of the present invention have been explained in detail above, but these are merely examples, and do not limit the scope of the invention. The features disclosed in the claims also encompass modes obtained by variously modifying or altering the specific examples shown above.

According to the present invention, asbestos in asbestos-containing substances can be detoxified more favorably than in the past, and it is possible to greatly contribute to a prevention in adverse effects on humans and the environment by asbestos.

The invention claimed is:

1. A method for detoxifying asbestos, the method comprising:
   preparing an asbestos-containing substance that contains at least one type of asbestos;
   preparing an asbestos treatment agent that contains a mineral acid and N-methyl-2-pyrrolidone; and
   bringing the asbestos-containing substance into contact with the asbestos treatment agent so as to detoxify asbestos in the asbestos-containing substance.

2. The method for detoxifying asbestos according to claim 1, wherein the asbestos-containing substance contains at least chrysotile.

3. The method for detoxifying asbestos according to claim 1, wherein the mineral acid is sulfuric acid.

4. The method for detoxifying asbestos according to claim 1, wherein the asbestos-containing substance is brought into contact with the asbestos treatment agent for a period of 1 to 2 hours.

5. The method for detoxifying asbestos according to claim 1, wherein the asbestos treatment agent is heated to a temperature range that is higher than 50° C. and lower than the boiling point of the treatment agent before the asbestos-containing substance is brought into contact with the asbestos treatment agent.

6. The method for detoxifying asbestos according to claim 1, wherein the asbestos-containing substance that is brought into contact with the asbestos treatment agent is in the form of a powder.

7. The method for detoxifying asbestos according to claim 1, wherein the concentration of the N-methyl-2-pyrrolidone is 0.1 to 10 wt % when the asbestos treatment agent as a whole is taken to be 100 wt %.

* * * * *